United States Patent [19]
Penzkofer et al.

[11] 3,958,774
[45] May 25, 1976

[54] STORAGE DEVICE FOR A SAFETY BELT WITH VEHICLE-SENSITIVE LOCKING

[75] Inventors: Franz Penzkofer, Munich; Josef Wiesböck, Dachau, both of Germany

[73] Assignee: Hans Kolb KG, Munich, Germany

[22] Filed: Jan. 20, 1975

[21] Appl. No.: 542,289

[30] Foreign Application Priority Data
Oct. 29, 1974 Germany............................ 2451430
Oct. 29, 1974 Germany............................ 2451431
Jan. 21, 1974 Germany............................ 2402634

[52] U.S. Cl......................................... 242/107.4 A
[51] Int. Cl.²........................................ B65H 75/48
[58] Field of Search............ 242/107.4; 280/150 SB; 297/386, 388

[56] References Cited
UNITED STATES PATENTS

| | | | |
|---|---|---|---|
| 2,437,786 | 3/1948 | Oberdorf | 242/107.4 |
| 3,323,749 | 6/1967 | Karlsson | 242/107.4 |
| 3,495,786 | 2/1970 | Hemens | 242/107.4 |
| 3,666,198 | 5/1972 | Neumann | 242/107.4 |
| 3,758,044 | 9/1973 | Nilsson | 242/107.4 |

FOREIGN PATENTS OR APPLICATIONS

| | | | |
|---|---|---|---|
| 936,180 | 9/1963 | United Kingdom | 242/107.4 |

*Primary Examiner*—Edward J. McCarthy
*Attorney, Agent, or Firm*—Baldwin, Wight & Brown

[57] ABSTRACT

A storage device for a safety belt with vehicle-sensitive locking of belt in the direction of pull-out, including a coiling shaft rotatably mounted in a housing, a ratchet wheel axially movable on the coiling shaft and provided with peripheral teeth and with teeth on an end face, a pawl to arrest rotation of the ratchet wheel, an inertia member for moving the pawl into engagement with the peripheral teeth of the ratchet wheel, and teeth fast with the housing with which the end face teeth of the ratchet wheel co-operate and lock upon axial displacement thereof, wherein the ratchet wheel on that side remote from the end face teeth is stepped so that the top circle diameter of the peripheral teeth is smaller than the external diameter of the end face teeth. The ratchet wheel is mounted on the shaft by a smooth trunnion and has an internal thread which co-operates with an external thread on the shaft. Thus, within limits the ratchet wheel may rotate and move axially relative to the shaft. Spring means biasing the shaft for rotation in a direction of belt wind-up comprises a pair of spiral springs in series.

8 Claims, 8 Drawing Figures

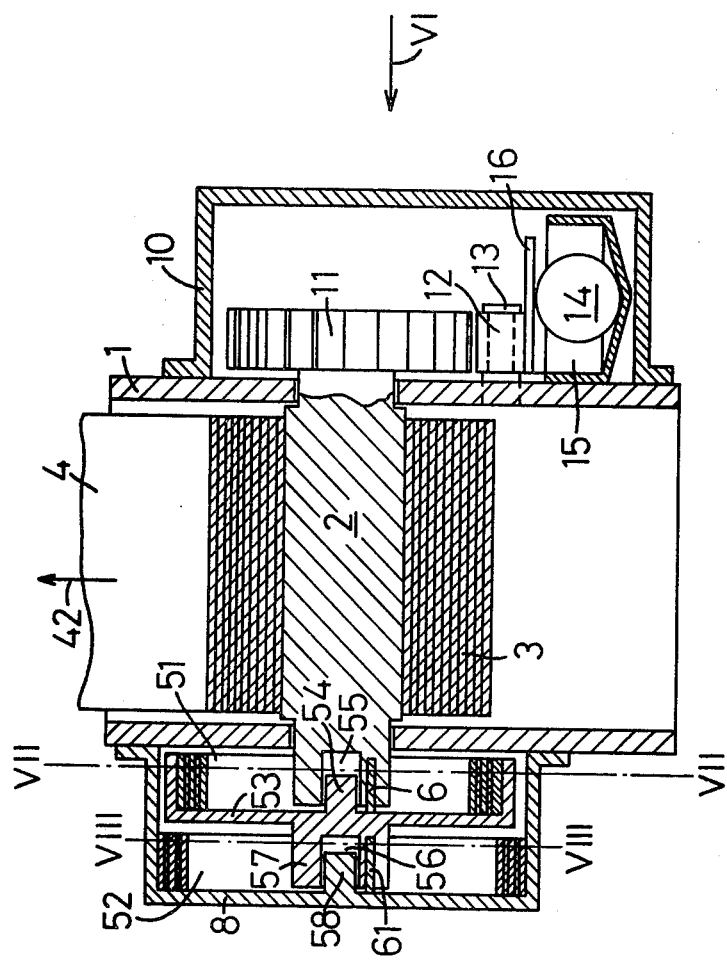
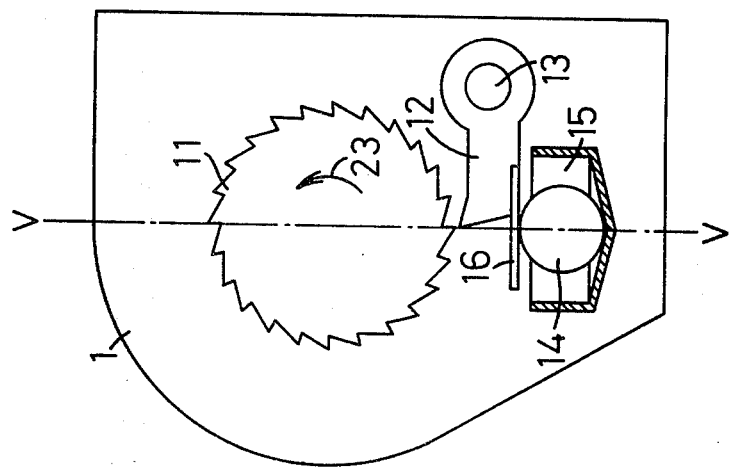
Fig. 5
Fig. 6

STORAGE DEVICE FOR A SAFETY BELT WITH VEHICLE-SENSITIVE LOCKING

Storage devices for safety-belts, in which the belt is wound up on a reel, are finding more and more acceptance in motor vehicles. They serve for protecting the belt when not being worn and for so holding it, in readiness, that the safety belt can at any time, immediately be put on. The belt is pulled out, i.e., unwound from the reel, against the action of a spring force which, when the safety belt is taken off, causes the belt to reel up again.

In such devices, the belt must be locked in the pull-out direction, when the vehicle concerned is decelerated in order that the safety belt fulfils its proper function, that is to say holds the seat occupant, in the vehicle, in his seat. If it were not for this locking of the belt, the occupant would be hurled forwards out of his seat.

Belt-sensitive and/or vehicle-sensitive, inertia locking mechanism are known which lock the belt against pull-out or withdrawal from the storage device or reel, at a specific belt pull-out acceleration of, for example, 1g, or at a specific vehicle deceleration of, for example, 0.4g, that is to say, at about half of the vehicle decelaration which takes place in an emergency braking.

The storage devices, for rolling up the belt, have a winding or coiling shaft, rotatably mounted in a housing, to which shaft the belt is secured to one end and which shaft is at one end connected to a spiral tension spring. The spiral spring loads the winding or coiling shaft in such a direction of rotation that the belt is reeled up on to the shaft. As a rule, at the other end of the winding or coiling shaft there is provided the belt-sensitive and/or vehicle-sensitive device for locking the belt against pull-out or withdrawal from the storage device.

For vehicle-sensitive locking of the belt, in the direction of pull-out, it is known to mount a ratchet wheel fast on the rotatable winding or coiling shaft with which ratchet wheel a detent or pawl is capable of being made to engage, under the influence of a movable inertia member. The inertia member may comprise a ball resting in a support. When the ball moves out of the resting position, the detent or pawl is caused to move into engagement with the ratchet wheel, thereby locking it and the shaft against rotation in a belt pull-out direction. Instead of a ball, the inertia member may comprise an inverted frustro-conical member standing on its smaller diameter end and capable of tilting at a specific deceleration of the vehicle to actuate locking of the belt.

It is also known to mount the ratchet wheel on the winding or coiling shaft so that, within limits, it can turn and move axially relative to the winding or coiling shaft. Thus the ratchet wheel may have an internal screw thread and the winding or coiling shaft may have a corresponding external screw thread. The ratchet wheel may have peripheral teeth and an annular set of teeth on an end face, the latter being adapted to engage, upon axial displacement of the ratchet wheel, with teeth fixed with or part of a main housing of the storage device. When the detent or pawl is brought into engagement with the peripheral teeth, of the ratchet wheel, upon displacement of the inertia member, the ratchet wheel is held against further rotation and with a slight turning of the winding or coiling shaft, through pull on the safety belt, the ratchet wheel moves axially against the action of a restoring spring, so that the teeth on the face end come into engagement with the teeth fixed with or part of the main housing. Thus the ratchet wheel and the winding or coiling shaft are locked against rotation and further pull-out or withdrawal of the belt is prevented.

This latter construction is, moreover, belt-sensitive in that the ratchet wheel itself is an inertia member; that is to say when the belt is pulled out with sudden acceleration of for example, 1g, the ratchet wheel, in angular movement lags behind the winding or coiling shaft so that the shaft rotates relative to the ratchet wheel, whereby the ratchet wheel is displaced axially into locking engagement with the fixed teeth on the main housing. A further turning of the winding or coiling shaft is therefore arrested and belt pull-out is blocked.

In those devices with vehicle-sensitive, belt locking and a toothed wheel which is rotatable and axially moveable relative to the winding or coiling shaft, difficulties arise, particularly in view of the manufacturing tolerances, the elastic deformations of the engaging components and the possibility that the teeth on the end face of the ratchet wheel and on the main housing may stand point to point and not engage properly with each other. Furthermore, these devices have comparatively large dimensions, especially in the region of the toothed wheel, of the detent or pawl co-operating therewith and of the body of inertia actuating the latter; the toothed wheel is comparatively large and therefore the detent (or pawl) and the inertia member have to be arranged relatively far from the axis of rotation of the winding or coiling shaft.

In the belt-sensitive and/or vehicle-sensitive belt locking mechanisms having a ratchet wheel rotatable and axially movable with respect to the winding or coiling shaft, the mounting of the ratchet wheel, in known constructions, is unsatisfactory. It is effected, for example, via a comparatively coarse-pitch internal screw thread on the ratchet wheel and corresponding, likewise coarse-pitch external screw thread on the winding or coiling shaft. This can lead to trouble, for example by reason of jammings, tiltings or dirt between ratchet wheel and winding or coiling shaft.

Difficulties also result in regard to the spring loadings of the winding or coiling shaft. When the safety belt is put on, by an occupant of a vehicle seat, and the belt is pulled off the winding or coiling shaft, the spiral, tension spring coupled to the shaft is tensioned, so that, when the belt is taken off, the belt automatically rewinds back on to the shaft. It is desirable that when the belt is completely wound up, the spiral spring should still expert on the shaft a certain force in order reliably to ensure the said complete winding-up and to avoid a loosening or slipping of the wound up belt. On the other hand, however, even when the length of belt pulled out is comparatively large, the spring should not act with excessive force on the shaft, in order that the safety belt does not press too strongly against the user. In the ideal case, the spring loading of the winding or coiling shaft should remain constant, independently of the length of belt pulled out.

This is not the case in the known devices. The spring force which acts on the shaft when the belt is pulled out is so high that appreciable pressures on the user result when the safety belt is put on. Despite this, the spring force acting on the shaft when the belt is wound up is comparatively low. Finally, the length of belt which can be pulled out or unwound is limited. In the usual safety belt rolling-up devices for motor vehicles, the greatest length of belt that can be pulled out or unwound is about 200 to 220cm. With the belt fully withdrawn, the spring loading of the winding or coiling shaft may apply a tensile force of between 1.5 and 2.5 kp on the belt and with the belt fully rolled-up or wound-up, this tensile force decreases to about 0.2 to 0.3 kp, which, as a rule, is too small to ensure a reliable, complete winding-up of the belt.

The present invention seeks to provide a safety belt storage device and inertia locking mechanism which overcomes the disadvantages and difficulties set out above.

The present invention provides a storage device for a safety belt with vehicle-sensitive locking of belt in the direction of pull-out, including a coiling shaft rotatably mounted in a housing, a ratchet wheel axially movable on the coiling shaft and provided with peripheral teeth and with teeth on an end face, a pawl to arrest rotation of the ratchet wheel, an inertia member for moving the pawl into engagement with the peripheral teeth of the ratchet wheel, and teeth fast with the housing with which the end face teeth of the ratchet wheel and co-operate and lock upon axial displacement thereof, wherein the ratchet wheel on that side remote from the end face teeth is stepped so that the top circle diameter of the peripheral teeth is smaller than the external diameter of the end face teeth.

Further according to the present invention there is provided a storage device for a safety belt with belt-sensitive or vehicle-sensitive locking of the belt in the direction of pull-out, including a coiling shaft rotatably mounted in a housing, and a ratchet wheel mounted on the coiling shaft, said ratchet wheel having an internal thread engaging with an external thread on the shaft, whereby the ratchet wheel is rotatable and axially movable relative to the shaft, wherein the ratchet wheel is movably mounted on said shaft by a smooth trunnion.

By another feature of the present invention there is provided a storage device for a safety belt, including a rotatably mounted coiling shaft which is joined to a spiral spring, to which shaft one end of the belt is secured and on to which shaft the belt can be wound, and spring means biassing the shaft for rotation in belt wind-up direction, wherein said spring means comprises a pair of spiral springs arranged in series.

Embodiments of the present invention are now described, by way of example, with reference to the accompanying drawings, in which FIG. 1 is a longitudinal sectional view along the line I—I in FIG. 2 and shows a first embodiment of the invention;

FIG. 5 is a longitudinal sectional view taken along the line V—V in FIG. 6 and shows a third embodiment;

FIG. 6 is a side elevational view taken in the direction of the arrow VI in FIG. 5; the front housing cover being removed;

In the following description, like reference numerals are used to identify like parts.

Figure 1:
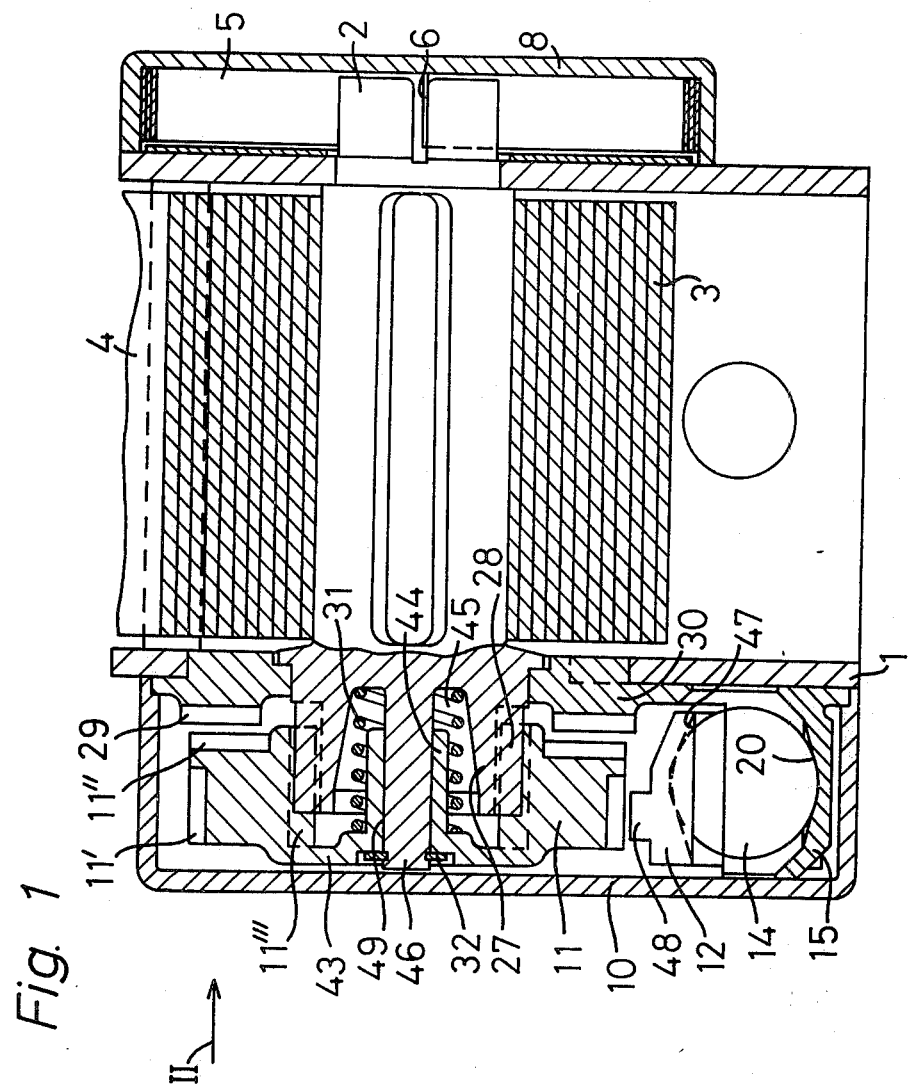

Referring to the drawings, the mechanism includes a housing 1 in which is rotatably mounted a winding or coiling shaft 2 on which is a coil 3 of webbing comprising a safety belt 4. The belt 4, at one end, is secured to the shaft 2 and its other, free, end extends from the housing 1.

One one side of the housing there is provided a spiral, tension spring 5 with as flat a characteristic line as possible, which spring is secured at its inner end 6, to the shaft 2 and at its outer end 7 to a cover 8 which is screwed to the housing 1. When the belt 4 is pulled out of the housing 1, when the safety belt is put on, the shaft 2 rotates in the direction of the arrow 23 (see FIG. 4) and the spiral spring 5 is tensioned. When the safety belt is taken off, the belt 4 is automatically pulled into the housing 1 and wound or rolled on to the shaft 2, under the action of the spring loading of the tension spring 5.

Inside a cover 10, screwed to the housing 1, there is provided at the other end of the winding or coiling shaft 2, a ratchet wheel 11 with peripheral teeth 11' of sawtooth profile. Adjacent the ratchet wheel 11 there is pivotally mounted about a pin 13 fixed to the housing, a detent or pawl 12 which can be actuated by an inertia member in the form of ball 14. The ball 14 rests in a cage 15 fast with the housing 1.

In the embodiment according to FIGS. 5 and 6, the toothed wheel 11 is secured to the winding or coiling shaft 2 and the detent or pawl 12 is arranged below the ratchet wheel 11 with a lateral tongue 16 of the pawl, resting on the ball 14. The ratchet wheel is fast with the shaft 2 and the shaft is locked against rotation in a direction of belt withdrawal, when the pawl 12 is lifted into engagement with the ratchet wheel upon displacement of the ball 14.

In FIGS. 1 to 4, the ratchet wheel 11 has, besides the peripheral teeth 11''' teeth 11'' on an end face, and an internal screw thread 11''''. The coiling shaft 2 extends with a section 27 into the ratchet wheel 11. On the section 27 is provided an external screw thread 28 which co-operates with the internal screw thread 11'''', of the ratchet wheel 11. Fixed teeth 29 are provided on the housing opposite the teeth 11'' on the end face of the ratchet wheel. These fixed teeth 29 are formed on a component 30, stationary with the housing, consisting of plastics material. Between the coiling shaft 2 and the ratchet wheel 11 is a restoring spring 31 which biases the ratchet wheel 11 away from the fixed teeth 29 and against a stop 32.

Figure 2:
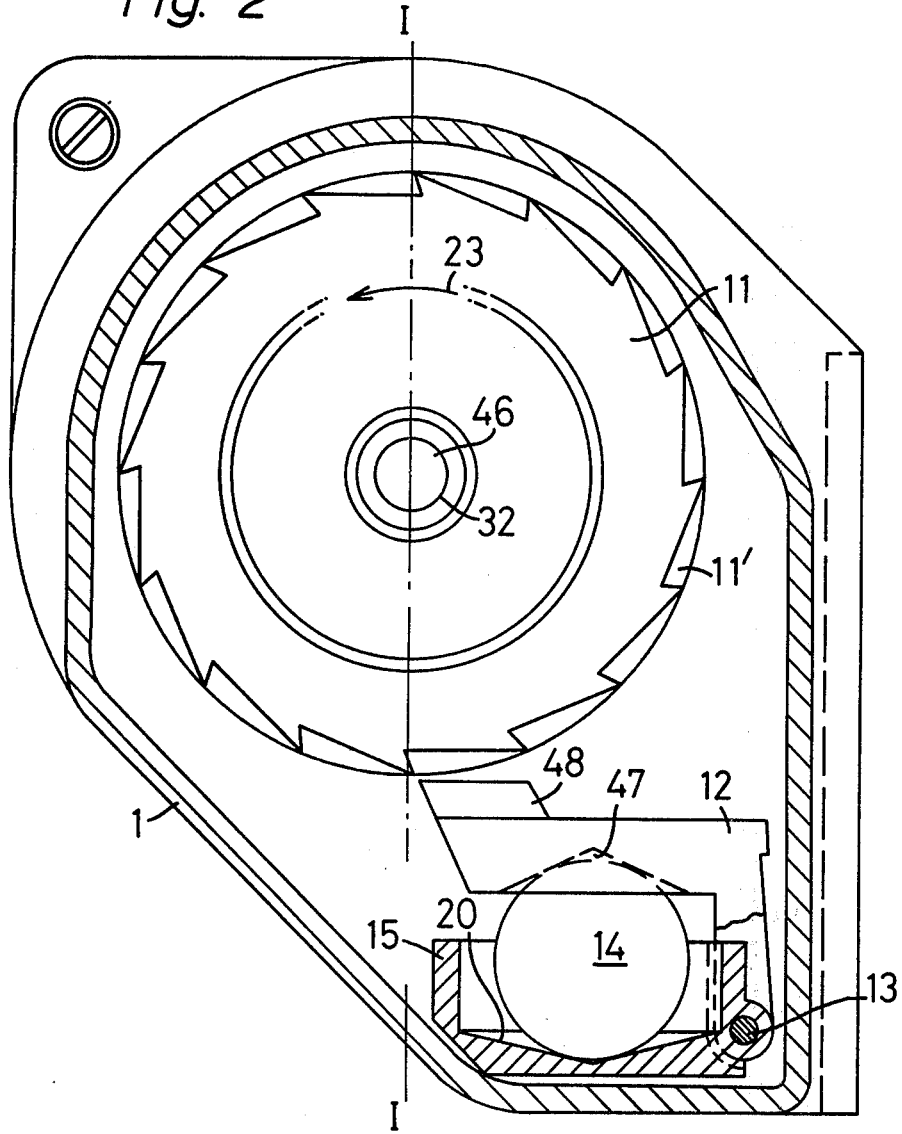
FIG. 2 is a side elevational view taken in the direction of the arrow II in FIG. 1; the front housing cover being removed and some components being shown in longitudinal section.

In the embodiment according to FIGS. 1 and 2 ratchet wheel 11 has, on the side remote from the end face teeth 11'' or the coiling shaft 2, a cover-like section 43 from which extends a central hollow journal 44. This journal projects into a recess 45 in the adjacent end of the coiling shaft 2 and is slidingly guided on an axial trunnion 46 on the coiling shaft 2. The spring 31 is arranged in the recess 45 and surrounds the hollow journal 44. At one end the spring bears against the coiling shaft 2 and at its other end against the cover-like section 43 of the ratchet wheel 11. The free end of the trunnion 46 is provided with a snap (retaining) ring which forms the stop 32 for the ratchet wheel 11.

The pawl 12 is located beneath the toothed wheel 11 and pivots about the horizontal pin 13 stationary with the housing. The pawl 12 is in the form of an angle arm with one arm approximately vertical and the other approximately horizontal. The pin 13 is provided at the free end of the vertical arm while the horizontal arm lies on the ball 14. The cage 15 has a conical bottom 20.

In the resting position, reproduced in the FIGS. 1 and 2, the ball 14 occupies the lowest position in the cage 15, lying in a conical recess 47 of the horizontal arm of the pawl. The pawl 12 is out of engagement with the ratchet wheel 11; this in turn is out of engagement with the fixed teeth 29, stationary with the housing, under the bias of the spring 31. The coiling shaft 2 is therefore freely rotatable in the housing 1.

When a relative acceleration between ball 14 and cage 15 takes place, caused by a corresponding deceleration of the vehicle in which the storage device is fitted the ball 14 moves out of the lowest position in he cage 15. The result of this is that the pawl 12, with a toothed-shaped projection 48, is pivoted into engagement with the peripheral teeth 11' of the ratchet wheel 11, so that rotation of the ratchet wheel 11, in the direction of the arrow 23, is locked. By the pull exerted on the belt 4, the coiling shaft 2, however, is turned slightly further in the direction of the arrow 23, so that the ratchet wheel 11 is screwed along the coiling shaft 2 against the action of the spring 31, until the end face teeth 11'' come into engagement and lock with fixed teeth 29 stationary with the housing. The further pull-out of belt from the housing 1 is then locked.

The toothed wheel 11 is movably and slidably guided on the smooth trunnion 46 on the winding or coiling shaft 2. The screw thread 11''' and 28, between which there may exist a not inconsiderable play, have therefore no kind of guiding or bearing function. In this way it is possible to ensure a length/diameter ratio of the bearing surfaces which is particularly favorable for mounting the ratchet wheel. In the case described, the bearing surface concerned is the bore 49 of the hollow journal 44 and the ratio of the length/diameter should be at least 1:5.

In the case described, the trunnion 46, for the ratchet wheel 11, is formed by an axial extension of the coiling shaft 2. Instead of being integral with the coiling shaft 2, the trunnion 46 may be a separate rod or stem screwed or otherwise fitted to the end of the coiling shaft 2 in a manner not shown. Also, it is possible that one end of the rod which serves for securing the belt 4 to the coiling shaft 2 can be made to project from the end of the coiling shaft 2, in order to serve as the trunnion for the ratchet wheel 11.

The securing of the belt to the coiling shaft by means of a rod is effected by pushing a looped end of the belt, which is to be secured, through a diametrical longitudinal slot of the coiling shaft 2, which slot is tapered to have a wider and a narrower section. The rod is inserted into the loop at the end of the belt and, through pull on the belt, drawn into the broader section of the longitudinal slot, in the winding or coiling shaft, with the belt extending through the narrower slot section, in order that the belt will wrap itself round the coiling shaft.

Figure 3:
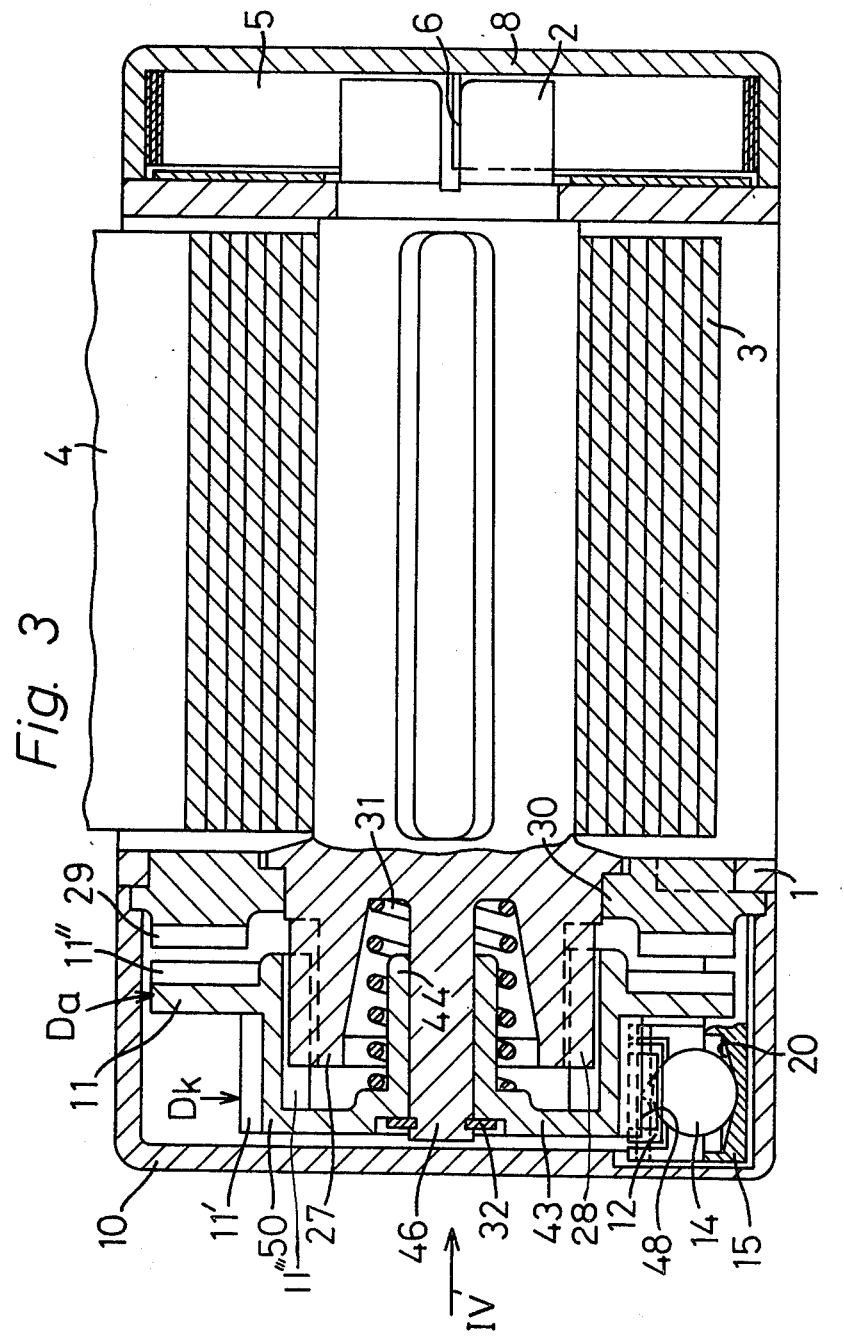
FIG. 3 is a longitudinal sectional view taken along the line III—III in FIG. 4 and shows a second embodiment.
Figure 4:
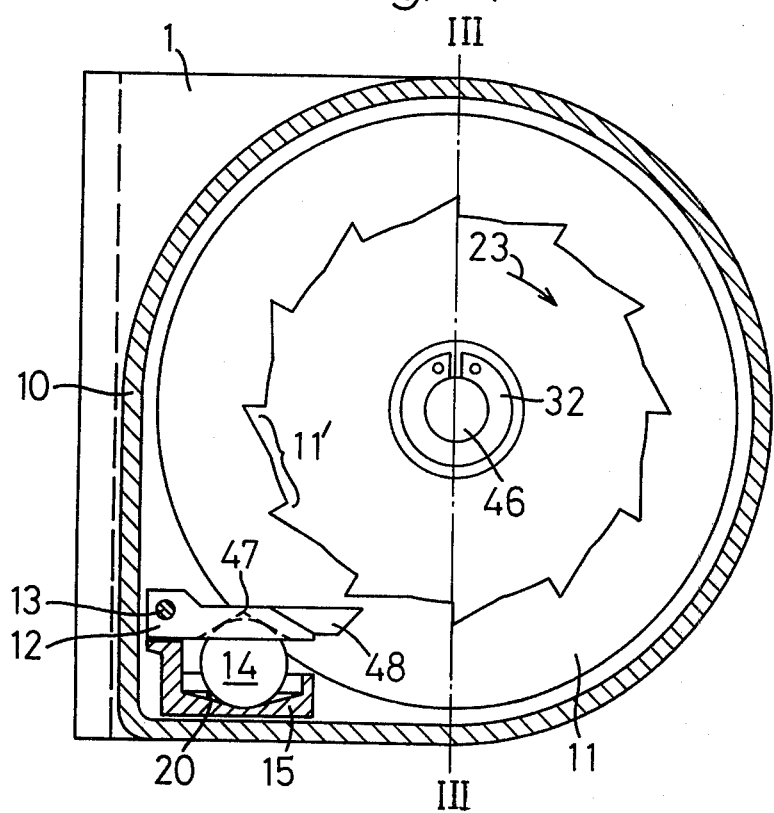
FIG. 4 is a side elevational view taken in the direction of the arrow IV in FIG. 3; the front housing cover being removed and some components being shown in longitudinal section.

The embodiment according to FIGS. 3 and 4 differs from that according to FIGS. 1 and 2 in that the peripheral teeth 11' of the ratchet wheel 11 are provided on a sleeve-shaped section 50 of the ratchet wheel 11 which, internally, has the screw thread 11''' engaging with external screw thread on the coiling shaft 2.

The ratchet wheel 11 is therefore, on the side remote from the end face teeth 11'', considerably stepped, so that the top circle diameter $D_R$ of the peripheral teeth 11' is smaller than the external diameter $D_a$ of the end face teeth 11''. This renders it possible to place the pawl 12, ball 14 and cage 15 comparatively close to the axis of rotation of the shaft 2 and of the ratchet wheel 11, so that a compact construction results. Nevertheless, not only is the power transmission or loading between the fixed teeth and the end face teeth 11'' equally as well ensured, as in the other embodiments, but also a sufficient moment of inertia of the ratchet wheel 11 is ensured since, in the region facing the coiling shaft 2, the ratchet wheel extends comparatively far radially outwardly.

In contrast to the embodiment according to FIGS. 1 and 2, in the embodiment according to FIGS. 3 and 4 the pawl is not formed as angled lever but as a straight arm lever. It lies on the ball 14, the cage 15 of which has a conical bottom without an opening 21. However, if desired, the conical bottom could be provided with an opening or recess 21 to receive the ball 14.

In the resting position, reproduced in the drawing, the ball 14 occupies the lowest position in the cage 15, lying in the conical recess 47 of the pawl 12. In this position, the pawl is out of engagement with the ratchet wheel 11. When there is a relative acceleration between ball 14 and cage 15, caused by a corresponding deceleration of the vehicles in which the storage device is fitted the ball 14 moves out of the lowest position in the cage 15, so that the pawl, with the tooth-shaped projection 48, is pivoted into engagement with the peripheral teeth 11' of the ratchet wheel and rotation of the ratchet wheel 11, in the direction of the arrow 23, is blocked. Through the pull exerted on the belt 4, however, the coiling shaft 2 is turned slightly further in the direction of the arrow 23, so that the ratchet wheel 11 screws along the coiling shaft 2, against the action of the spring 31, until the end face teeth 11'' come into engagement and lock with the fixed teeth 29, stationary with the housing. Further pull-out of belt, out of the housing 1, is then blocked.

Figure 7:
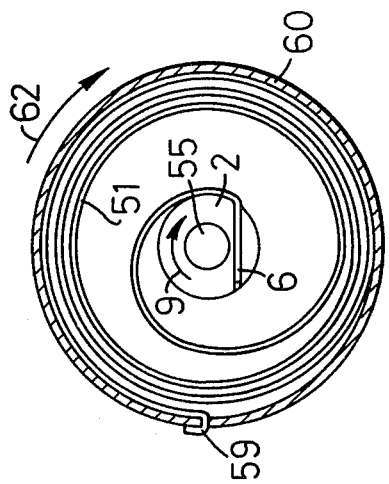
FIGS. 7 and 8 are transverse sectional views taken along the lines VII—VII and VIII—VIII, respectively in FIG. 5.
Figure 8:
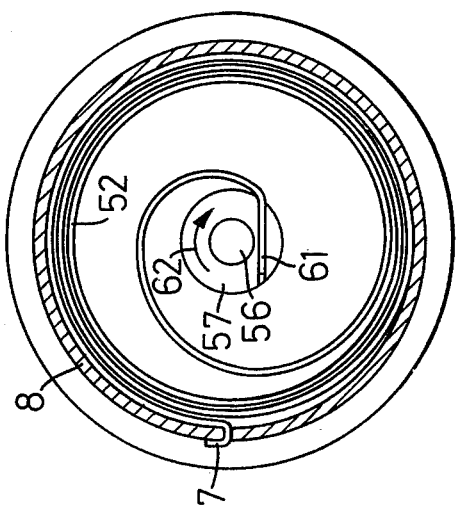

In the embodiment according to FIGS. 5 and 8 special measures are taken for the spring loading of the coiling shaft 2. Instead of a single spiral spring 5, a pair of spiral springs is provided, namely two spiral springs 51 and 52 which are arranged in series, i.e., successively and join together and between the shaft 2 and the housing 1 or cover 8 secured to the housing. Between the two spiral springs 51 and 52 is provided a freely rotatable, bell-shaped member 53. The member 53 is formed with an axial journal 54 rotatably mounted in a bore 55 of the shaft 2 and with a boss 57 having an axial bore 56. An internal central journal 58, of the cover 8, is received on the bore 56. The inner end 6 of the spiral spring 51 is secured to the shaft 2 and the outer end 59 of said spring is secured to the periphery 60 of the bell-shaped member 53, as can be seen from FIG. 7. The inner end 61 of the spiral spring 52 is secured to the boss 57 of the bell-shaped member 53 and the outer end 7 of said spring is secured to the cylindrical side wall of the cover 8, as can be seen from FIG. 18. The cover 8 encloses the spiral spring 52 and the bell-shaped member 53, with the spiral spring 51 lying within the member 53.

In the drawing, the storage device is reproduced in that state in which the belt 4 is fully wound up on the shaft 2. The springs 51 and 52 exert, on the shaft 2, a torque which suffices to ensure this complete wind up of the belt. When the safety belt is put on, the belt 4 is pulled in the direction of the arrow 42 out of the housing 1, so that the shaft 2 and the ratchet wheel 11 rotate in the direction of the arrow 23. The shaft 2 tensions the spiral spring 51, so that the member 53 turns in the direction of the arrow 62 and the spiral spring 52 also is tensioned. The two spiral springs 51 and 52 may have the same or a different characteristic.

Through an arrangement of two spiral springs 51 and 52 in series, it is possible to achieve a force acting on the belt which hardly changes over a comparatively large range of pulled-out belt, when the belt 4 is unwound from the shaft 2. Even when the length of belt withdrawal is more than 200 to 220 cm, the tensile force increases only insignificantly over that which is present with the belt fully wound-up.

If when the safety belt is being worn, the vehicle provided with the device is braked and, for example decelerated with 0.4g, the ball 14 moves in the cage 15 and pivots upwardly the pawl 12 in FIG. 6 so that this engages in the peripheral teeth 11' of the ratchet wheel 11. The shaft 2 is therefore blocked in the direction of pull-out of the belt 4 and the user who has put on the belt is safely restrained in his seat.

When the safety belt is taken off, the belt 4 automatically runs back into the housing 1, winding itself on to the shaft 2, into the coil 3. Rotation of the shaft 2, to wind up the belt is caused by uncoiling of the spiral springs 51 and 52.

What we claim is:

1. A storage device for a vehicle safety belt, said storage device comprising a housing, a coiling shaft, means mounting said coiling shaft for rotation in said housing, means for connecting a safety belt to said coiling shaft for coiling thereon, a ratchet wheel, said coiling shaft having an elongated smooth trunnion fast therewith, said ratchet wheel having a journal engaging said trunnion and mounting said ratchet wheel for rotation and axial movement relative to said coiling shaft, cooperating internal and external thread means on said ratchet wheel and said coiling shaft for effecting axial movement of said ratchet wheel in response to relative rotation between said ratchet wheel and said coiling shaft, said thread means normally interconnecting said ratchet wheel and said coiling shaft for rotation in unison, said thread means being formed separate from said trunnion and journal and arranged in spaced concentric relation relative thereto, said ratchet wheel having peripheral teeth and end teeth, a pawl for engaging said peripheral teeth for preventing rotation of said ratchet wheel with said coiling shaft, an inertia member engageable with said pawl for moving said pawl into engagement with said peripheral teeth, and fixed teeth on said housing for interlocking engagement with said end teeth after axial movement of said ratchet wheel to prevent further rotation of said coiling shaft.

2. The storage device of claim 1 together with an axial pressure spring between said ratchet wheel and said coiling shaft urging said ratchet wheel away from said fixed teeth.

3. The storage device according to claim 1 wherein said ratchet wheel on that side remote from said end teeth is stepped so that the top circle diameter of said peripheral teeth is smaller than the external diameter of said end teeth.

4. The storage device according to claim 3, wherein said peripheral teeth are provided on a sleeve-shaped section of said ratchet wheel, said sleeve-shaped section and an adjacent backing face of said ratchet wheel which backs said end face teeth defining together with adjacent portions of said housing a recess containing said inertia member and said pawl whereby the overall size of the storage device is reduced.

5. The storage device according to claim 1 wherein said trunnion has a length to diameter ratio of at least 1.5.

6. The storage device according to claim 1 wherein siad journal extends into a recess in an end of said coiling shaft.

7. The storage device according to claim 2 wherein said journal extends into a recess in an end of said coiling shaft, and said pressure spring surrounds said journal in said recess.

8. The storage device according to claim 1 wherein said coiling shaft is joined to spring means biasing said coiling shaft for rotation in a belt wind-up direction, wherein said spring means comprises a first spring with its inner end attached to said coiling shaft and its outer end attached to the periphery of a freely rotatable cell-shaped member and a second spring having its inner end attached to a central boss of the bell member and its outer end attached to a fixed point on said housing.

* * * * *